H. BABCOCK.
Milk-Safes.
No. 150,219. Patented April 28, 1874.
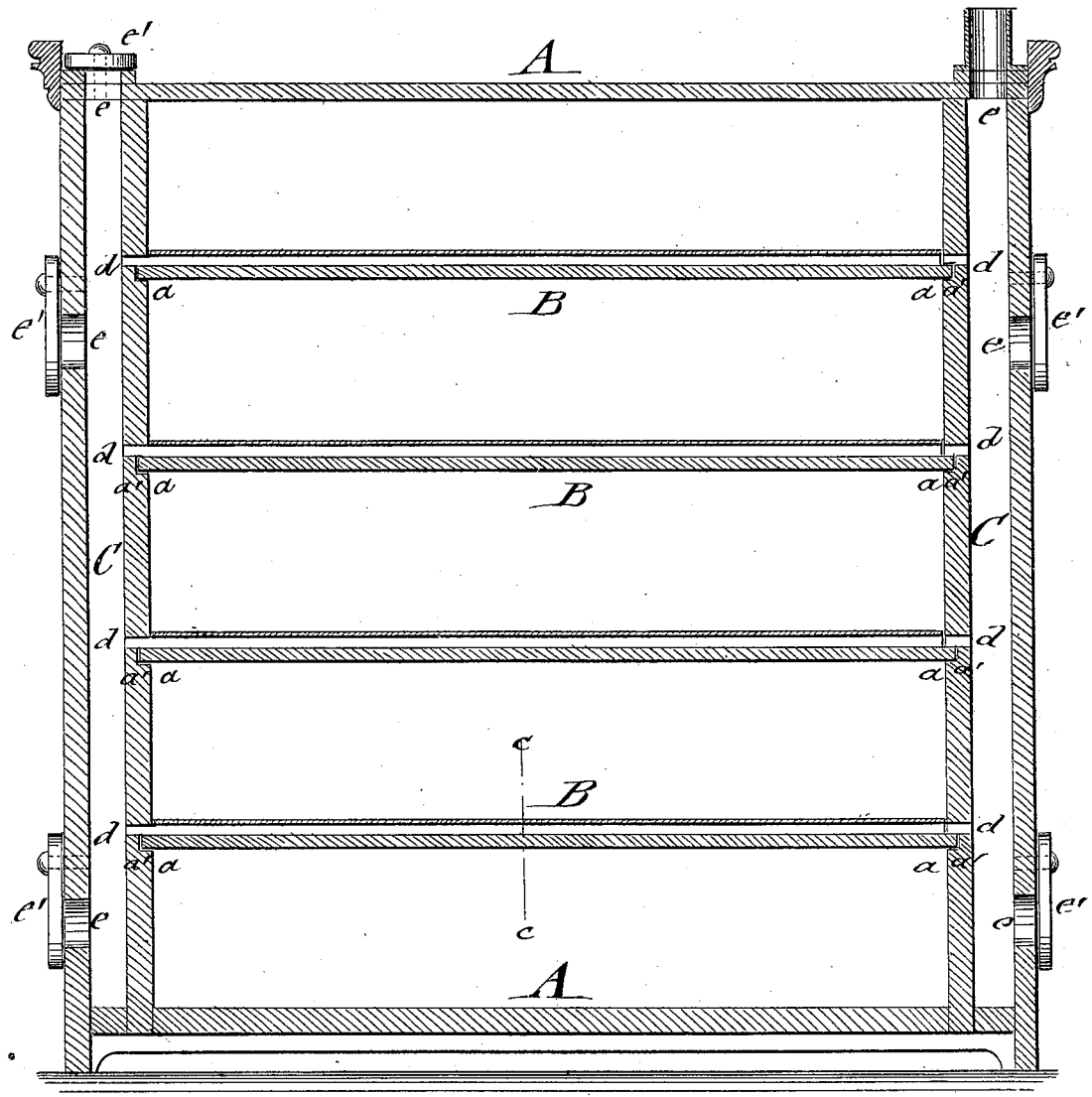
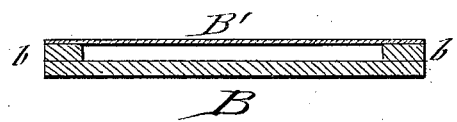
WITNESSES:
INVENTOR:
BY
ATTORNEYS.

UNITED STATES PATENT OFFICE.

HIRAM BABCOCK, OF APLINGTON, IOWA.

IMPROVEMENT IN MILK-SAFES.

Specification forming part of Letters Patent No. 150,219, dated April 28, 1874; application filed March 28, 1874.

*To all whom it may concern:*

Be it known that I, HIRAM BABCOCK, of Aplington, in the county of Butler and State of Iowa, have invented a new and Improved Milk-Safe, of which the following is a specification:

In the accompanying drawing, Figure 1 represents a vertical longitudinal section of my improved milk-safe; and Fig. 2, a detail vertical transverse section on the line $c\ c$, Fig. 1, through one of the cooling-shelves.

Similar letters of reference indicate corresponding parts.

The object of my invention is to provide an improved safe to be used for cooling milk and other articles, which is of simple and cheap construction, and, by means of a continuous current of air passing under the articles, very effective for cooling the same. My invention consists of a safe provided with hollow sliding shelves, which are closed at the sides, but open at the ends, where they connect, by slotted apertures, with air-chambers at both sides of the shelves, through which a current of air is kept up by regulating draft-holes and a pipe-connection with chimney.

In the drawing, A represents the frame of the milk or other safe, which is provided with closely-fitting glass or other doors, and a series of horizontal shelves, B. Air-chambers C are formed at both sides of the safe by means of vertical partitions D, into which the shelves C slide by their projecting ends $a$, being supported by corresponding recesses $a'$. The shelves B are made hollow, an air-space being formed in longitudinal direction through the same as their upper surface B, preferably of sheet metal, is raised on longitudinal side strips $b$ to suitable distance from the base part, as shown in Fig. 2. The open ends of shelves B connect, by slots $d$ of partitions D, with the air-chambers C, and form thereby the communication from one chamber to the other. Draft-holes $e$, with pivoted covers $e'$, for regulating the admission of air, are arranged in the outer side walls and the top of the safe, so that the air may enter and circulate freely through the safe in either direction, and a continuous draft be produced by connecting one of the top or side apertures $e$ with the chimney.

The air passing continually under the metallic surface of the shelves, keeps the temperature in the safe at a low degree, cools off the articles placed thereon, and causes the raising of more cream from the milk cooled thereon, than in the ordinary way.

Having thus described my invention, I claim as new and desire to secure by Letters Patent—

The improved safe for cooling milk and other articles, consisting of hollow sliding shelves B, in connection with grooved and slotted partition-walls D and air-chambers C, having draft-holes $e$ for producing the circulation of air through the shelves in the manner and for the purpose set forth.

HIRAM BABCOCK.

Witnesses:
C. S. PRINCE,
J. W. LAMB.